(12) United States Patent
Karimi et al.

(10) Patent No.: US 12,738,584 B2
(45) **Date of Patent: *Sep. 15, 2026**

(54) ELECTRONIC DEVICE HOUSING WITH INTEGRATED BATTERY COMPARTMENT

(71) Applicant: Geotab Inc., Oakville (CA)

(72) Inventors: Sajjad Karimi, Mississauga (CA); Usman Younas, Georgetown (CA); Clinton Mackenzie, Thorold (CA); Michael Pirruccio, Oakville (CA)

(73) Assignee: Geotab Inc., Oakville (CA)

( * ) Notice: Subject to any disclaimer, the term of this patent is extended or adjusted under 35 U.S.C. 154(b) by 524 days.

This patent is subject to a terminal disclaimer.

(21) Appl. No.: 18/493,897

(22) Filed: Oct. 25, 2023

(65) Prior Publication Data

US 2024/0313320 A1 Sep. 19, 2024

Related U.S. Application Data

(60) Provisional application No. 63/451,945, filed on Mar. 14, 2023.

(51) Int. Cl.

| | |
|---|---|
| ***H01M 50/247*** | (2021.01) |
| ***H01M 50/213*** | (2021.01) |
| ***H01M 50/284*** | (2021.01) |
| ***H01M 50/289*** | (2021.01) |

(52) U.S. Cl.

CPC ....... *H01M 50/247* (2021.01); *H01M 50/213* (2021.01); *H01M 50/284* (2021.01); *H01M 50/289* (2021.01)

(58) Field of Classification Search

CPC ............. H01M 50/213; H01M 50/247; H01M 50/284; H01M 50/289

See application file for complete search history.

(56) References Cited

U.S. PATENT DOCUMENTS

| | | | |
|---|---|---|---|
| 5,211,579 | A | 5/1993 | Seong et al. |
| 2011/0293981 | A1 | 12/2011 | Fang et al. |
| 2012/0121970 | A1 | 5/2012 | Kozai |
| 2015/0194710 | A1 | 7/2015 | Naito |
| 2018/0053922 | A1 | 2/2018 | Van Roon et al. |
| 2019/0353984 | A1 | 11/2019 | Tetzel |
| 2021/0083255 | A1 | 3/2021 | Demont et al. |
| 2022/0223974 | A1 | 7/2022 | Zbiral et al. |
| 2023/0006301 | A1 | 1/2023 | Kneer et al. |
| 2023/0074688 | A1 | 3/2023 | Hernandez Saab et al. |

*Primary Examiner* — Jonathan G Jelsma

(74) *Attorney, Agent, or Firm* — Sherif Abdel-Kader

(57) ABSTRACT

A housing for an electronic device having an integrated battery compartment is provided. The integrated battery compartment has battery contacts and battery retainers that maintain batteries in place despite motion or impact forces.

19 Claims, 17 Drawing Sheets

ELECTRONIC DEVICE HOUSING WITH INTEGRATED BATTERY COMPARTMENT

RELATED APPLICATIONS

This application claims priority from U.S. provisional application No. 63/451,945 filed on Mar. 14, 2023, the contents of which are herein incorporated by reference in their entirety.

TECHNICAL FIELD

The present disclosure generally relates to electronic devices, and more specifically to an electronic device housing having an integrated battery compartment.

BACKGROUND

Numerous electronic devices are portable devices that rely on batteries for power. A typical battery-powered electronic device features an electronic device housing, an electronic printed circuit board (PCB), and battery compartment for holding one or more batteries. The housing may feature a first housing portion attached to a second housing portion. The battery compartment may be a separate component that is disposed within the housing and electrically coupled to the PCB by leads, wires, and/or connectors.

Some electronic devices undergo somewhat harsh conditions such as motion, shock, and humidity. As such, a typical housing may not provide sufficient protection for the electronic components on the PCB. The batteries in known battery compartments may be dislodged from their place as a result of impact, shaking, falls, or other types of motion. A battery compartment adds to the cost of the electronic device's bill of materials (BOM) due to the extra components such as leads, connectors, as well as the additional process steps in manufacturing.

SUMMARY

According to a broad aspect, the present disclosure describes an electronic device housing with an integrated battery compartment. The electronic device housing comprises a first housing portion and a second housing portion configured to be coupled with the first housing portion in a sealing connection therebetween for forming the electronic device housing. The second housing portion includes an integrated battery compartment. The integrated battery compartment has at least two opposite battery contacts at opposite sides of the integrated battery compartment for providing electrical connection with a battery inserted in the integrated battery compartment, the at least two opposite battery contacts each including a battery-engaging portion flexibly biased against a battery terminal of the battery for exerting an inward force axial to the battery and a downward force towards a bottom of the second housing portion. The integrated battery compartment also has at least one pair of opposite battery retainers configured for exerting a substantially radial inward force on a battery sidewall of the battery for retaining the battery in the integrated battery compartment.

Each battery retainer of the at least one pair of opposite battery retainers may be configured to flex outwardly upon abutting with the battery sidewall during insertion of the battery, and flex back inwardly upon full insertion of the battery into the integrated battery compartment for exerting the substantially radial inward force on the battery sidewall.

The at least one pair of opposite battery retainers may be comprised of a first battery retainer and a second battery retainer each extending upwardly from an integrated battery compartment bottom wall.

Each of the first battery retainer and the second battery retainer may comprise a convex upper portion for abutting and sliding against the battery sidewall during insertion of the battery.

Each of the first battery retainer and the second battery retainer may comprise a concave lower portion for encompassing a portion of the battery sidewall.

The second housing portion may have a sidewall including a groove at a top end thereof, the groove having a seal molded therein. The first housing portion may have a rib located and dimensioned for mating with and compressing the seal when the first housing portion and the second housing portion are coupled to one another in the sealing connection.

The second housing portion may be made using a two-step injection molding process including making the second housing portion including the groove using a first injection molding tool and injecting the seal in the groove using a second injection molding tool.

The at least two opposite battery contacts may further include two respective power terminals for providing power from the battery to a printed circuit board.

The at least two opposite battery contacts may each further comprise a top portion connected to the battery-engaging portion and angled for permitting the battery terminal to slide thereon during battery insertion.

The integrated battery compartment may be bounded at one end thereof by a battery compartment wall.

A first battery contact of the at least two opposite battery contacts may be attached to the battery compartment wall and a second battery contact of the at least two opposite battery contacts may be attached to a lower housing sidewall section opposite the battery compartment wall.

Each of the battery compartment wall and the lower housing sidewall section opposite the battery compartment wall may contain at least one battery contact retaining tab. Each of the at least two opposite battery contacts may have a backwall including an aperture shaped for receiving a battery contact retaining tab.

The battery contact retaining tab may be shaped for allowing the backwall to slide downwardly thereon until the battery contact retaining tab is inserted within the aperture.

The battery contact retaining tab may be shaped for preventing removal of the battery contact retaining tab from the aperture by an upward force on any of the at least two opposite battery contacts.

The at least two opposite battery contacts may comprise two single-battery contacts and two dual-battery contacts, and the integrated battery compartment holds three batteries.

Each of the two single-battery contacts may comprise a battery contact backwall having at least one overhang portion.

Each of the battery compartment wall and the lower housing sidewall section opposite the battery compartment wall may contain at least one battery contact support for supporting a corresponding single-battery contact of the two single-battery contacts at the at least one overhang portion thereof.

The at least one battery contact support may prevent downward and horizontal movements of each of the two single-battery contacts.

Each of the two dual-battery contacts is comprised of two battery contacts may be connected via a transverse connecting portion.

Each of the battery compartment wall and the lower housing sidewall section opposite the battery compartment wall may contain at least one battery contact support for supporting a corresponding dual-battery contact at the transverse connecting portion thereof.

The at least one battery contact support may prevent downward and horizontal movement the corresponding dual-battery contact.

The first housing portion may contain at least one anchoring member extending towards the second housing portion when the first housing portion is coupled with the second housing portion. The second housing portion may contain at least one anchor receiving member for receiving the at least one anchoring member.

The at least one anchoring member may be configured to pass through a via in a printed circuit board for anchoring the printed circuit board in a horizontal plane perpendicular to the at least one anchoring member.

One of the first housing portion and the second housing portion may contain a vent hole for receiving a vent.

The electronic device housing may further comprise a vent installed in the vent hole, the vent having an inlet and an outlet for connecting an interior of the electronic device housing to ambient air through the vent.

The vent further may have membrane installed on one of the inlet and the outlet, the membrane having an aperture for passing air through the vent while preventing liquids from passing through the vent.

The electronic device housing may further comprise a retainer pad for separating the battery and a printed circuit board (PCB), the retainer pad having a battery-facing side configured to engage a sidewall of the battery and a PCB-facing side that is generally planar to engage the printed circuit board.

BRIEF DESCRIPTION OF THE DRAWINGS

Exemplary non-limiting embodiments are described with reference to the accompanying drawings in which.

DETAILED DESCRIPTION

The present disclosure relates to an electronic device housing including an integrated battery compartment.

The electronic device housing holds the electronic and non-electronic components of an electronic device for the purpose of protecting such components from impact damage, temperature variations, moisture, tampering and the like. In some examples, the housing is comprised of a first housing portion and a second housing portion. One of the first housing portion and the second housing portion contains an integrated battery compartment.

The electronic device may comprise any device including electronic components and/or a printed circuit board (PCB) having a plurality of electronic components. Examples of an electronic device include, but are not limited to, an asset tracking device, a telematics device, a remote control device, a gaming controller, and a transistor radio.

The integrated battery compartment comprises a plurality of elements for retaining batteries in place even when the electronic device is moved, shaken, dropped, or suffers an impact. The integrated battery compartment also includes battery contacts for electrically connecting the batteries to one another, for example to form a serial connection therebetween. The integrated battery compartment also electrically connects the batteries to the electronic components and/or to the PCB by means of one or more power terminals.

The integrated battery compartment comprises battery retainers for retaining a battery in place. For example two opposite battery retainers are placed on opposite sides of a battery. The two opposite retainers are configured to flex outwardly (i.e., away from one another) when a battery is inserted therebetween, then flex back inwardly (i.e., towards one another) for retaining the battery in place upon full insertion of the battery in place within the integrated battery compartment.

Figure 1:
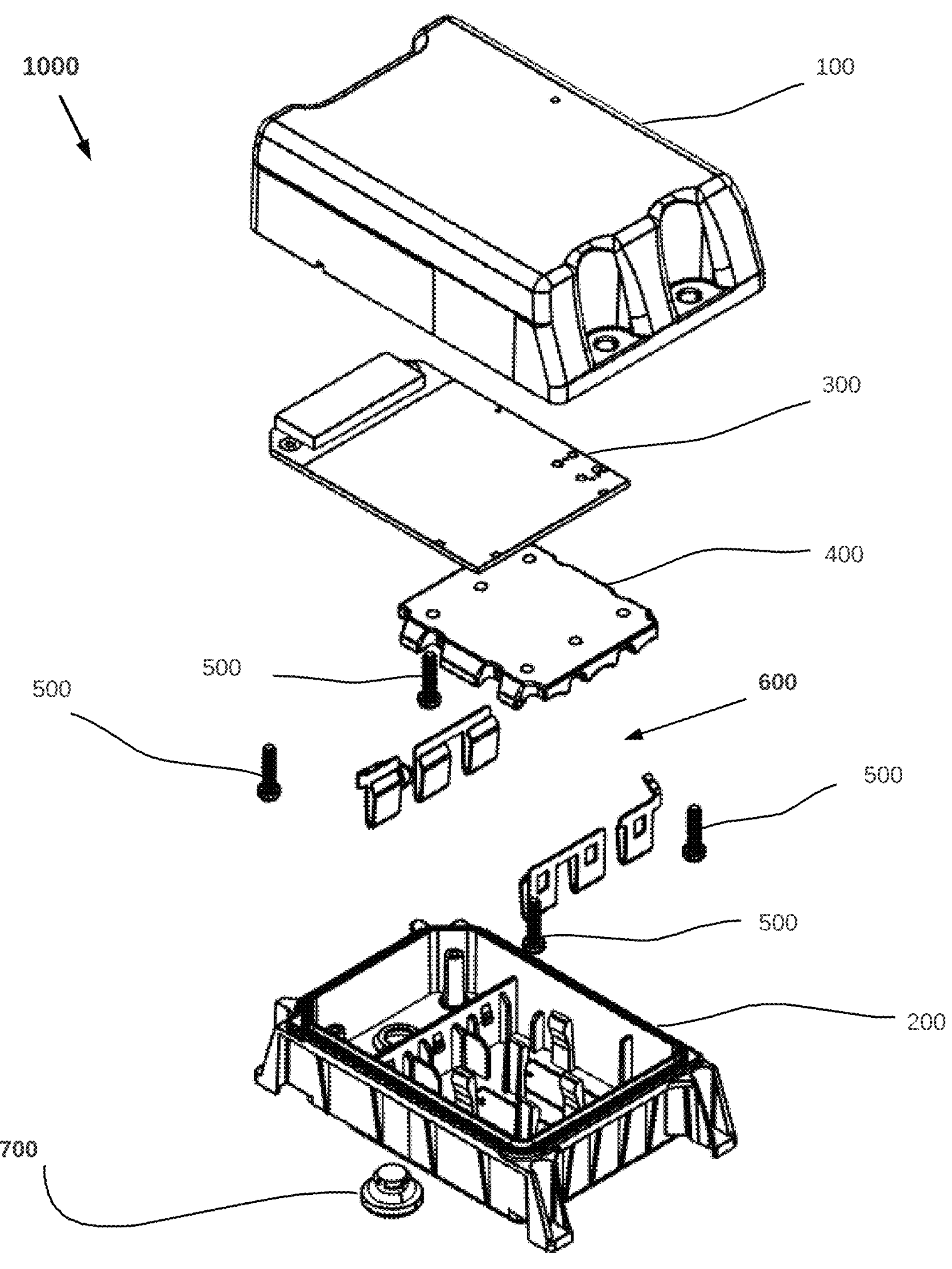
FIG. 1 is an exploded view of an exemplary electronic device, in accordance with embodiments of the present disclosure.
Figures 2A, 2B:
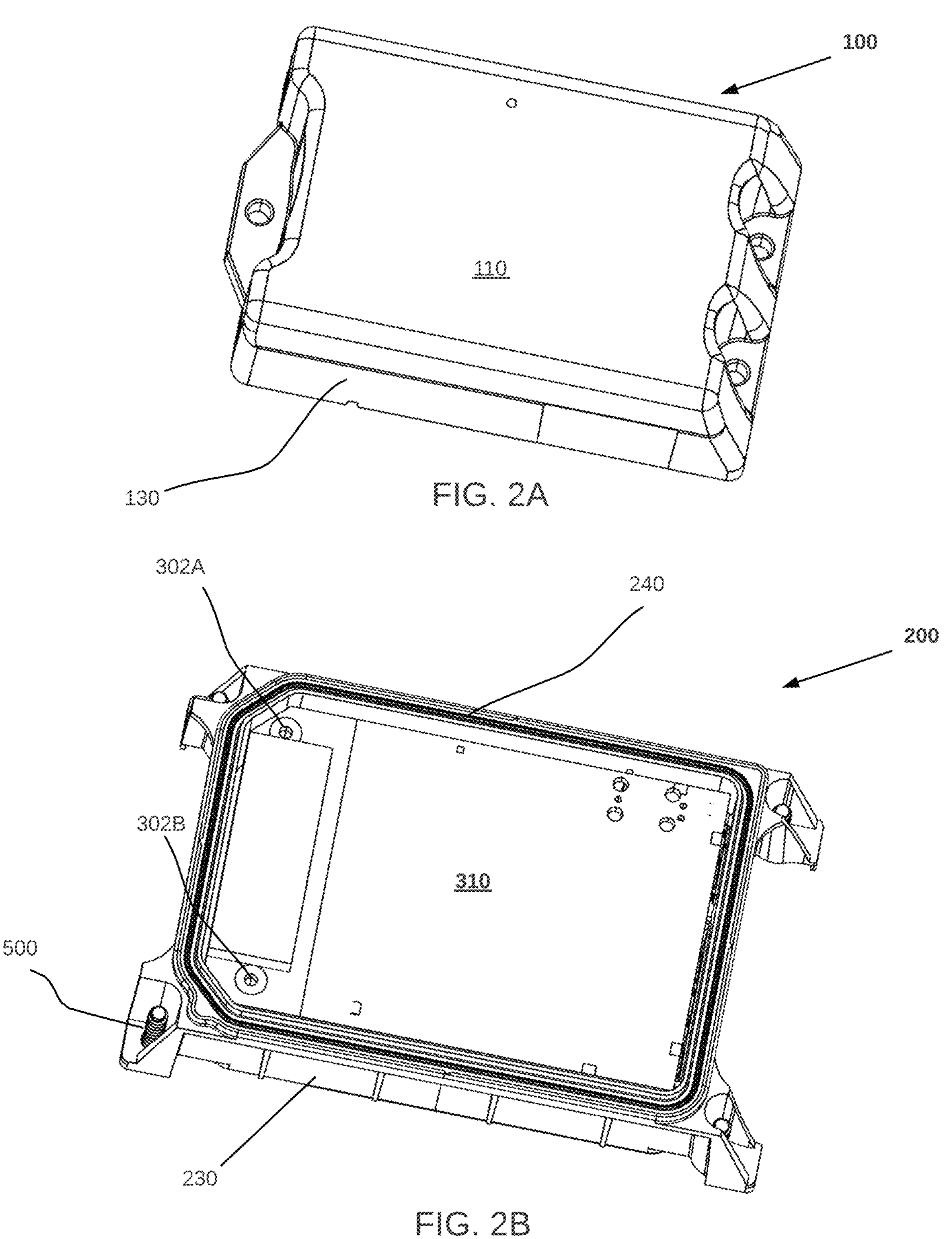
FIG. 2A is top left front perspective view of the upper housing portion of the exemplary electronic device.
FIG. 2B is a top left front perspective view of the lower housing portion of the exemplary electronic device.

An example of an electronic device housing 1000 is shown in FIG. 1 along with a PCB 300 that may be used therewith. The PCB 300 is not considered part of the electronic device housing 1000 and the functionality thereof is irrelevant. FIG. 1 is an exploded view that shows the various components of the electronic device housing 1000 as well as the relative position of the PCB 300 to the electronic device housing 1000. In the depicted example, the electronic device housing 1000 comprises an upper housing portion 100, a lower housing portion 200 that is connectable with the upper housing portion 100, a retainer pad 400, fasteners 500, battery contacts 600, and a vent 700. The various components and their functions are described below with reference to all the figures.

In this disclosure, the terms "lower housing portion" and "upper housing portion" are used to distinguish the two housing portions forming the electronic device housing 1000. It would be apparent to those of skill in the art that the terms "upper" and "lower" are not limiting. For example, it is possible that the electronic device housing 1000 would be installed such that the "upper housing portion" is facing the downward direction while the "lower housing portion" is facing the upward direction. Alternatively, the electronic device housing 1000 may be installed sideways. As such the "upper housing portion" may also be thought of as a "first housing portion" and the lower housing portion may be thought of as a "second housing portion". The battery retention components described make it possible that an electronic device housing 1000 comprising the first housing portion and the second housing portion be installed in any orientation without concern that the batteries may be dislodged from their place.

For ease of reference, the example electronic device housing will be assumed to have the orientation depicted in FIG. 1 wherein the first housing portion is an upper housing portion 100 and the second housing portion is a lower housing portion 200.

Connecting the Upper Housing Portion and the Lower Housing Portion Together

Figure 6:
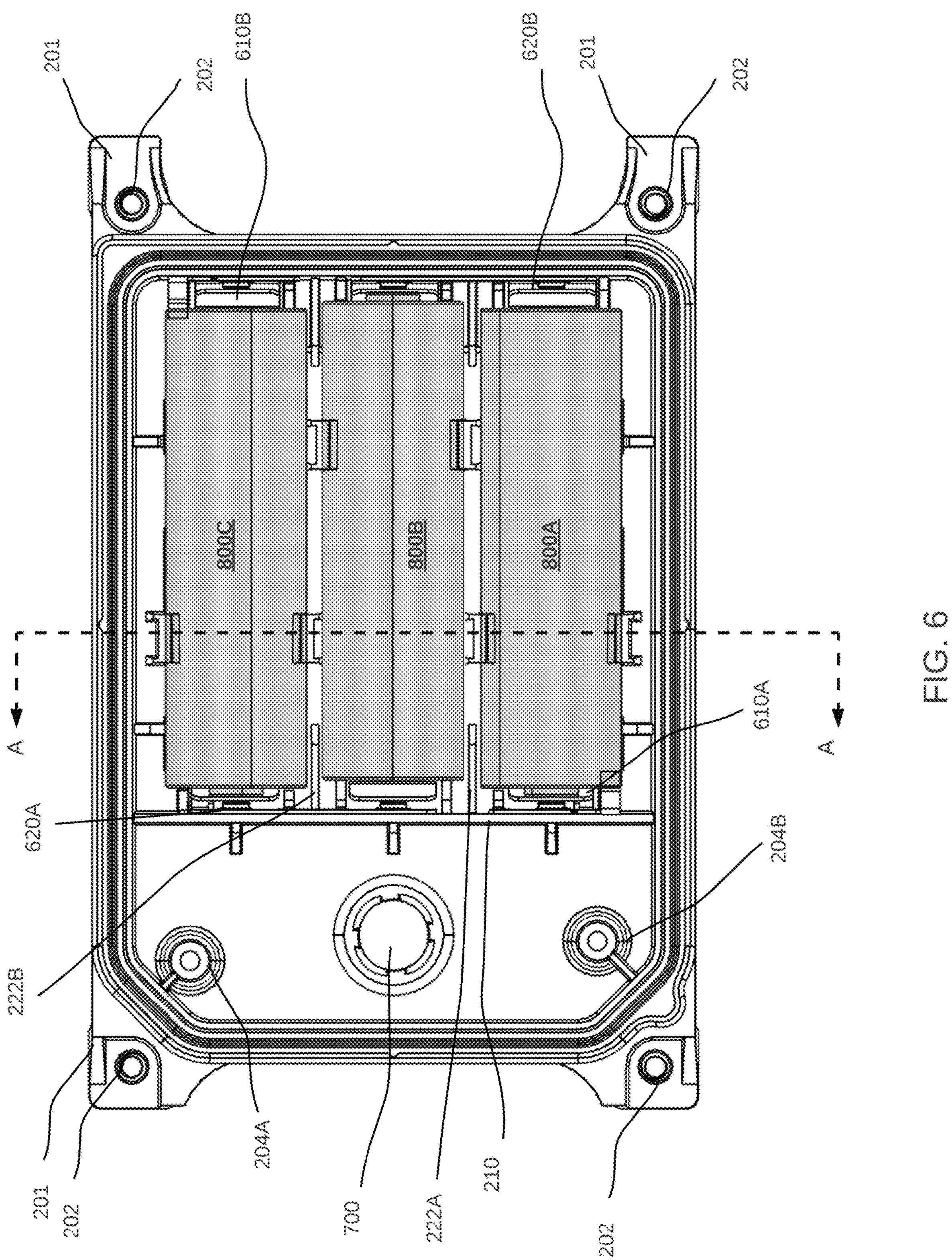
FIG. 6 is a top plan view of the second housing portion with batteries installed therein, in accordance with embodiments of the present disclosure.

The lower housing portion 200 has a lower housing bottom 235 and a lower housing sidewall 230. The lower housing portion 200 is shown as being generally cuboidal with an open top formed by the lower housing sidewall 230. However, many other shapes are contemplated. The top end of the lower housing sidewall 230 has a groove 205 in which a seal 240 is molded therein. The lower housing sidewall 230 has flanged portions 201 (best seen in FIG. 6) extending therefrom, the flanged portions 201 including holes 202 for receiving the fasteners 500 therethrough.

The upper housing portion 100 has an upper housing top 110 and an upper housing sidewall 130 extending from the upper housing top 110 for forming an interior space. A plurality of fastener sleeves 118 extend from the upper housing top 110 inside the interior space formed by the upper housing top 110 and the upper housing sidewall 130. The fastener sleeves 118 are located, with respect to the upper housing portion 100, at positions that correspond with the holes 202 of the flanged portions 201 of the lower housing portion 200, when the upper housing portion 100 and the lower housing portion 200 are coupled with one another to form the electronic device housing 1000.

A rib 120 extends from the upper housing top 110 downwardly towards inside the interior space of the upper housing portion 100 and generally follows the perimeter of the upper housing sidewall 130. The rib 120 is sized and positioned to mate with the seal 240 when the upper housing portion 100 and the lower housing portion 200 are coupled with one another.

To assemble the electronic device housing, the upper housing portion 100 is placed over the lower housing portion 200 such that the rib 120 compresses the seal 240 which is formed in the groove 205. Additionally, the fastener sleeves 118 are aligned with the holes 202 in the flanged portions 201. The fasteners 500 are then inserted through the holes 202 into the fastener sleeves 118 to tightly couple the upper housing portion 100 with the lower housing portion 200.

Seal Molding

The upper housing portion 100 and the lower housing portion 200 are formed using an injection molding process. The upper housing portion 100 and the lower housing portion 200 may be made of the same or different materials. Commonly, electronic device housings are made of a polymer-based material, such as polycarbonate (PC) due to its electrical insulation properties and light weight. In some implementations, the lower housing portion 200 is formed using a two-step injection ("two-shot injection") molding process. In the first injection molding step, the lower housing portion 200 including the lower housing sidewall 230 containing the groove 205 are molded using a first injection molding tool. In the second step, a second injection molding tool is used to inject the seal 240 within the groove 205. The seal 240 is made of a flexible material such as rubber, or another suitable substance known in the art. Advantageously, by using the two-step injection molding process to form the lower housing portion 200 and the seal 240, the seal 240 is secured within the groove 205 and cannot be removed easily by accident. Furthermore, the need to manually insert a flexible seal such as a gasket or an O-ring into the groove 205 is averted. Averting manual insertion of the seal eliminates the potential of an improperly placed seal between the upper housing portion 100 and the lower housing portion 200. An improperly placed seal could fail to prevent leakage of fluids into the interior of the electronic device housing 1000. An electronic device that uses the electronic device housing 1000 may need to be certified for ingress protection such as IP-68 and IP69K, in order to be eligible for deployment in certain fields. Therefore, having a reliable sealing connection between the upper housing portion 100 and the lower housing portion 200 is critical to obtaining such certification.

Printed Circuit Board and Supporting Members

The PCB 300 is not part of the electronic device housing 1000, but the dimensions and features of the PCB 300 need to be compatible with the electronic device housing 1000. An example of a PCB 300 is shown in FIG. 2A, FIG. 2B, FIG. 5A and FIG. 5B. The PCB 300 has two sides; a battery-facing side 320 and an upper housing facing side 310. The battery-facing side 320 has an active area 325, a positive power pad 330A and a negative power pad 330B (also referred to as the ground power pad). The power pads are for connecting the PCB 300 with power terminals, which provide electric power from the batteries to the PCB, as will be described below. The battery-facing side 320 has an active area 325 on which electronic components are placed and routed to one another. The active area 325 has substantially the same shape as the retainer pad 400 such that the retainer pad 400 shields the electronic components from the battery as will be described below. The PCB 300 has two vias 302A and 302B. The vias are through holes in the PCB 300.

The upper housing portion 100 and the lower housing portions contain members for retaining the PCB 300 in a stable position despite any motion or impact imparted on the electronic device housing 1000. For example, if the electronic device housing 1000 experiences an impact or a shaking movement in the horizontal plane thereof, the PCB 300 may be cracked or damaged if not properly anchored in place. Accordingly, in some implementations, the upper housing portion 100 has at least one anchoring member extending towards the lower housing portion 200 for mating with at least one anchor receiving member. The lower housing portion 200 has at least one anchor receiving member which receives the at least one anchoring member extending from the upper housing portion 100. To keep the PCB 300 anchored and stable in the horizontal plane thereof, the anchoring members tightly pass through vias in the PCB 300. For example, the upper housing portion 100 contains the pegs 116A and 116B extending from the upper housing top 110 towards the PCB 300. The vias are sized to tightly receive the anchoring members thus preventing motion in the horizontal plane of the PCB 300. In the depicted embodiment, the anchoring members are in the form of the pegs 116A and 116B, and the anchor receiving members are in the form of the peg receptors 204A and 204B. The peg receptors 204A and 204B are shown as upstanding cylindrical members having central bores sized for receiving the pegs 116A and 116B. In addition to receiving the pegs 116A and 116B, the anchor receiving members, such as the peg receptors 204A and 204B also serve as supports for the PCB 300 as discussed below.

Figure 3:
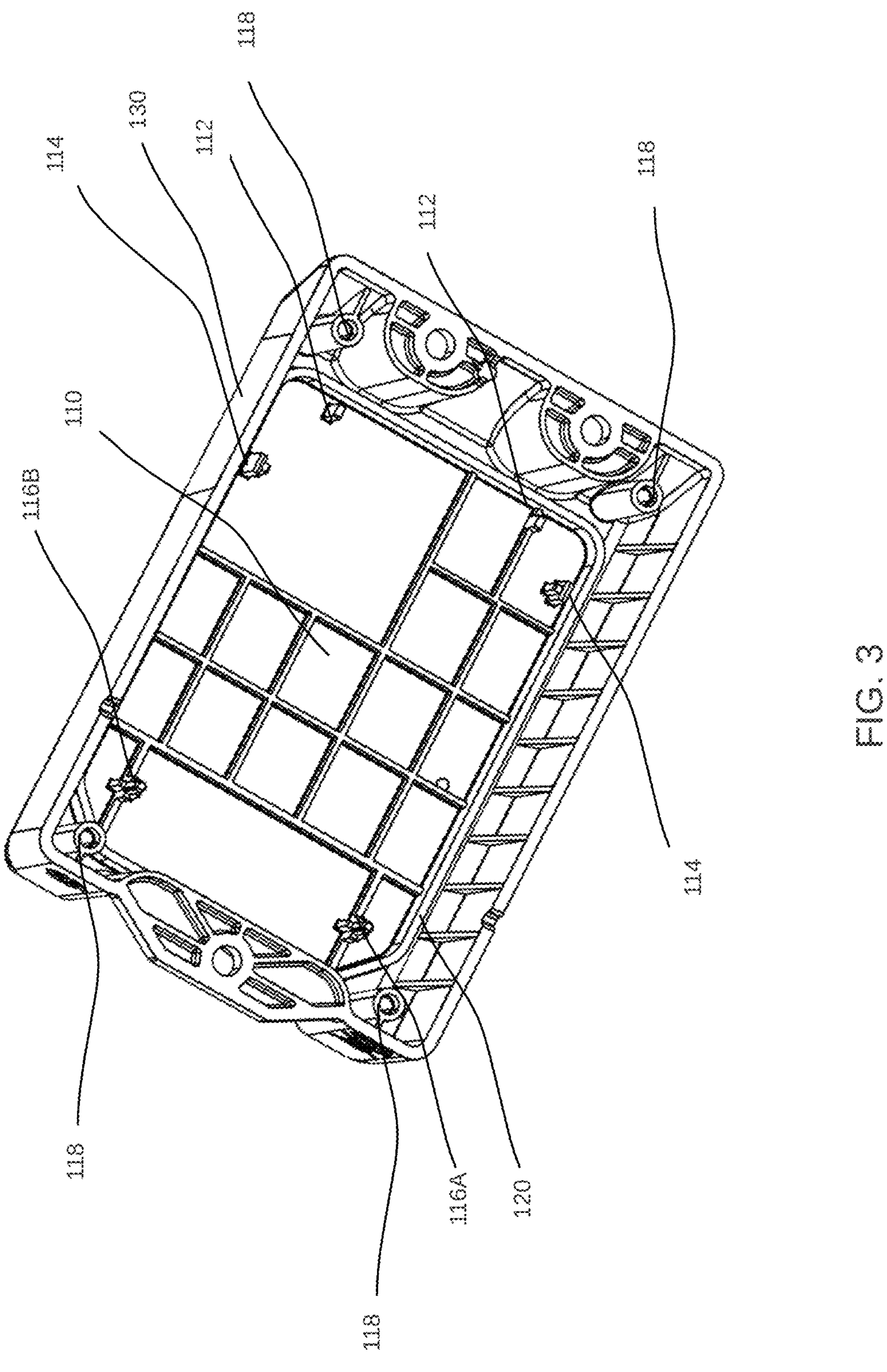
FIG. 3 is a bottom left rear perspective view of the first housing portion of the exemplary electronic device.
Figure 4:
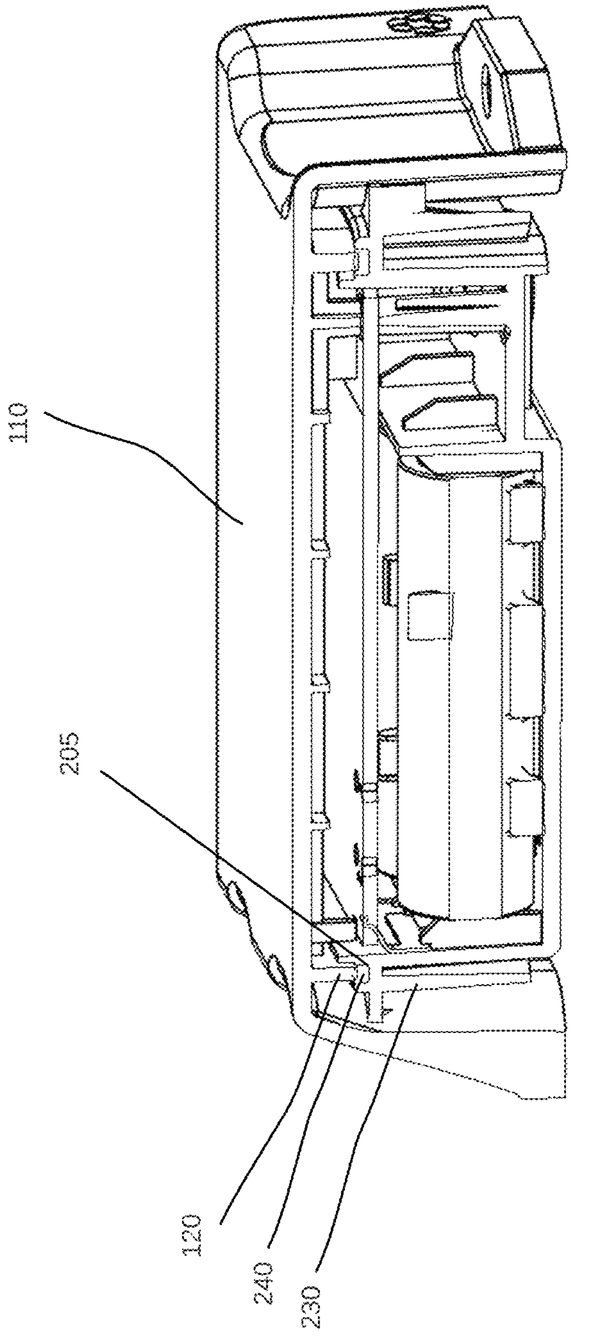
FIG. 4 is a partial sectional view of the exemplary electronic device showing a sealing connection between the first housing portion and the second housing portion.
Figure 5A:
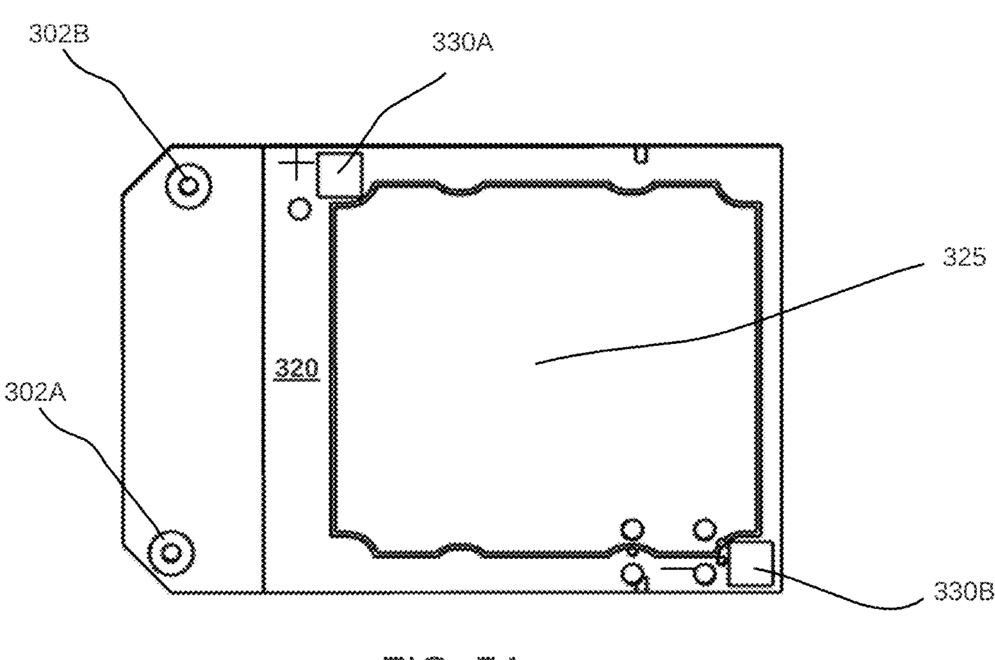
FIG. 5A is bottom plan view of an exemplary printed circuit board (PCB) showing the battery-facing surface thereof.
Figure 5B:
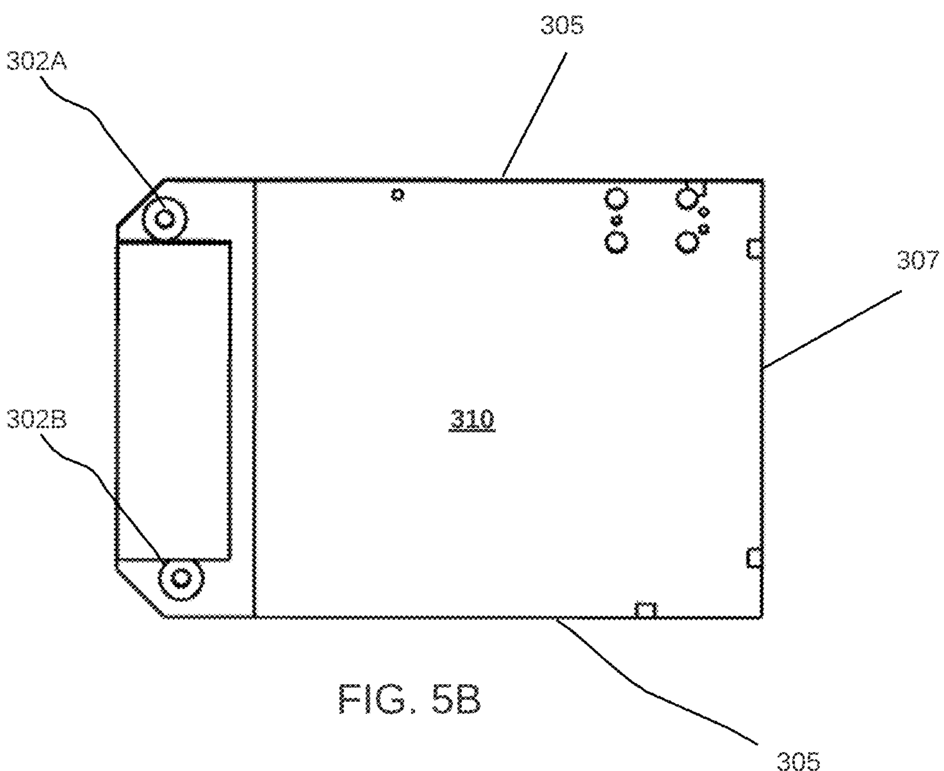
FIG. 5B is a top plan view of the exemplary PCB of FIG. 5A showing the non-battery facing surface thereof.

To support the PCB in the direction perpendicular to the horizontal plane thereof, PCB retainers and spacers are used. The upper housing portion 100 contains the PCB retainers 114 and the PCB spacers 112, as shown in FIG. 3. The lower housing portion 200 contains the peg receptors 204A and 204B, the battery compartment wall 210, and the PCB edge supports 212. When the PCB 300 is inserted within the lower housing portion 200, the PCB 300 rests on the peg receptors 204A and 204B such that the vias 302A and 302B are aligned with the bores in the peg receptors 204A and 204B. The PCB also rests on the battery compartment wall 210, and on the PCB edge supports 212. The edge supports are upstanding members having the same height as the battery compartment wall and support the PCB at the long edges thereof. When the upper housing portion 100 is coupled to the lower housing portion 200, the pegs 116A and 116B pass through the vias 302A and 302B, respectively and are retained within the bores in the peg receptors 204A and 204B. The retention of the pegs 116A and 116B within the bores of the peg receptors 204A and 204B while also passing through the vias 302A and 302B has the advantage of limiting lateral movement of the PCB 300 within the horizontal plane thereof. The PCB retainers 114 abut the long edges 305 of the PCB 300 both from the upper housing facing side and the edge thus adding further stability against movement of the PCB 300 in both the horizontal plane of the PCB 300 and the plane perpendicular thereto. The PCB spacers 112 keep the PCB 300 near the rear edge 307 thereof spaced from the inside surface of the upper housing top 110 thus protecting any electronic components that may be extending upwardly from the upper housing facing side 310.

Integrated Battery Compartment

The lower housing portion 200 has an integrated battery compartment 250. The integrated battery compartment 250 is bounded on ends sides thereof by the lower housing sidewall 230. On a fourth end thereof, the integrated battery compartment 250 is bounded by the battery compartment wall 210. The battery compartment 250 is configured to receive battery contacts 600 at opposite ends thereof. In the depicted embodiment, the battery contacts 600 are coupled to the battery compartment wall 210 and to the lower housing sidewall section opposite the battery compartment wall 210. The battery compartment 250 contains various elements for receiving and retaining the battery contacts 600 as well as elements for separating and retaining the batteries within the battery compartment 250.

Battery Contacts

Figure 12A:
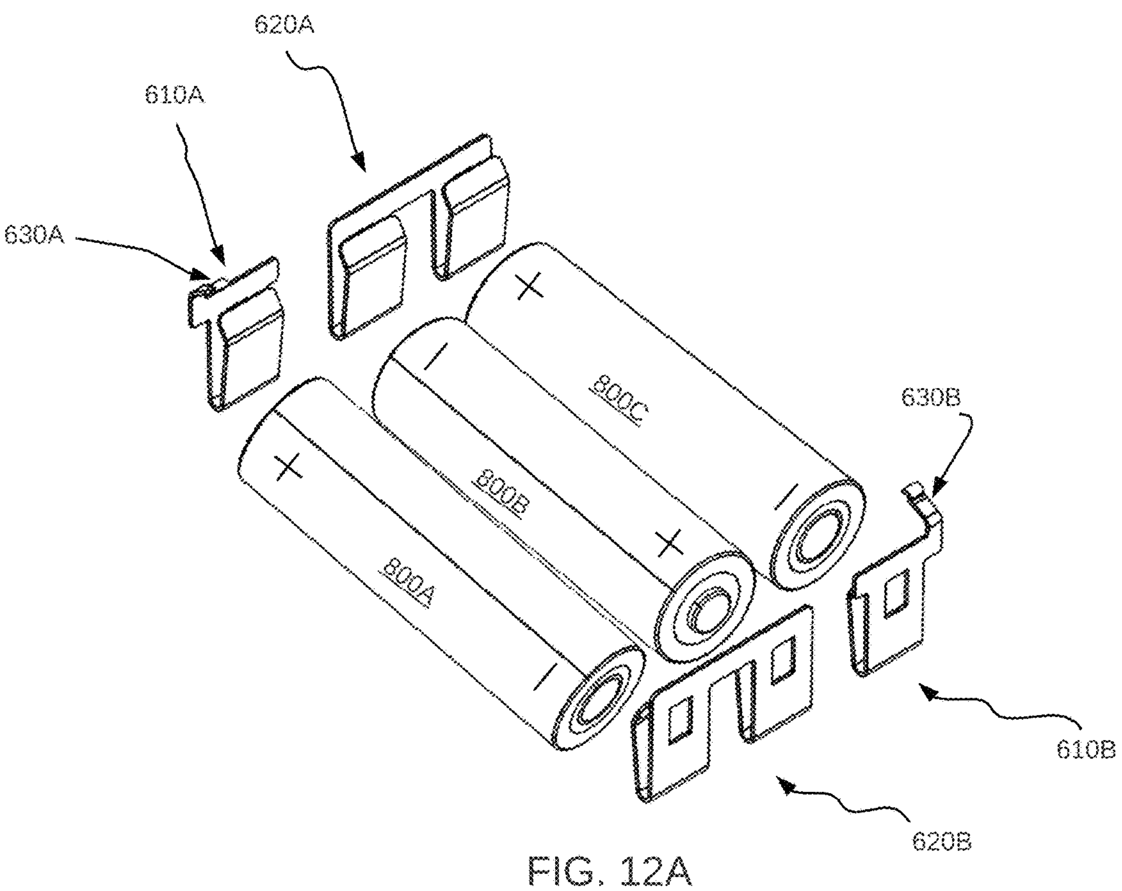
FIG. 12A is an exploded top left perspective view of battery contacts and corresponding batteries, in accordance with embodiments of the present disclosure.
Figure 12B:
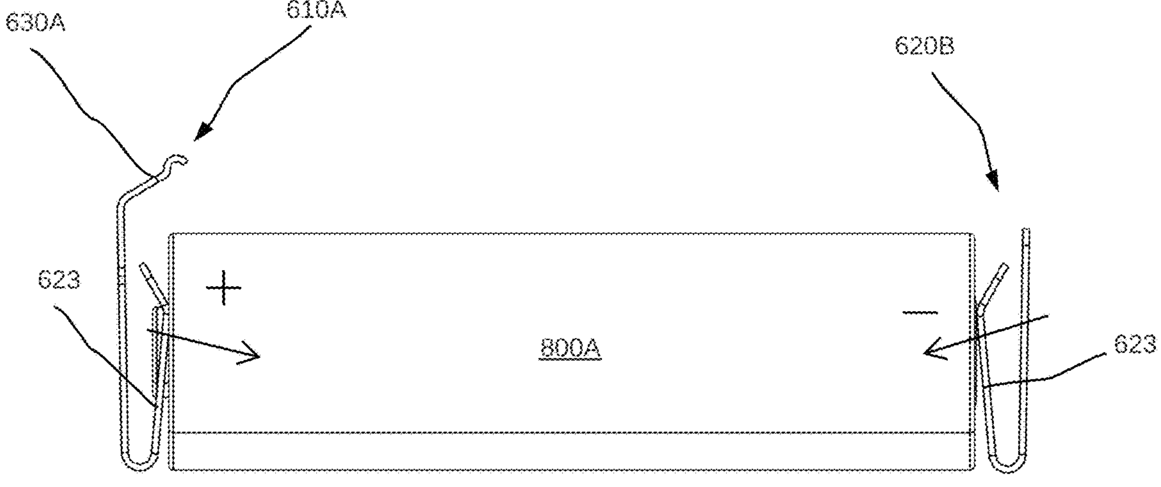
FIG. 12B is a side view showing a battery inserted between a single battery contact and a dual-battery contact, in accordance with embodiments of the present disclosure.

The battery contacts 600 provide electrical connectivity between the batteries and include power terminals for providing electric power to the PCB 300. In the depicted example, the battery compartment 250 holds the three batteries, namely the edge battery 800A, the center battery 800B, and the edge battery 800C (collectively "800"). If the batteries 800 are AA or AAA batteries, then each battery provides a voltage of 1.5V. Connecting the batteries 800 in series results in a supply voltage equal to the sum of the voltage of all batteries. For example, when three 1.5V AA or AAA batteries are connected in series, the resulting supply voltage is 4.5V. In order to connect the batteries 800 in series, the batteries are placed in alternate orientations relative to the battery compartment 250, and the battery contacts are arranged to provide a series connection between the batteries 800. FIG. 12A shows an exploded view of the batteries 800, the single-battery contacts 610A and 610B, and the dual-battery contacts 620A 620B. The configuration of FIG. 12A thus includes two single-battery contacts 610A and 610B, and two dual-battery contacts 620A and 620B. As shown in FIG. 12, the edge battery 800A connects at the positive terminal thereof to the single-battery contact 610A and connects at the negative terminal thereof to the dual-battery contact 620B. The center battery 800B connects at the positive terminal thereof to the dual-battery contact 620B and connects at the negative terminal thereof to the dual-battery contact 620A. The edge battery 800C connects at the positive terminal thereof to the dual-battery contact 620A and connects at the negative terminal thereof to the single-battery contact 610B. The electric power provided by the batteries 800 is conveyed to the PCB 300 by the positive power terminal 630A and the negative power terminal 630B each extending from the single-battery contacts 610A and 610B, respectively. In the depicted example, the single battery contact 610A has a positive power terminal 630A while the single battery contact 610B has a negative power terminal 630B.

Figures 10A, 10B:
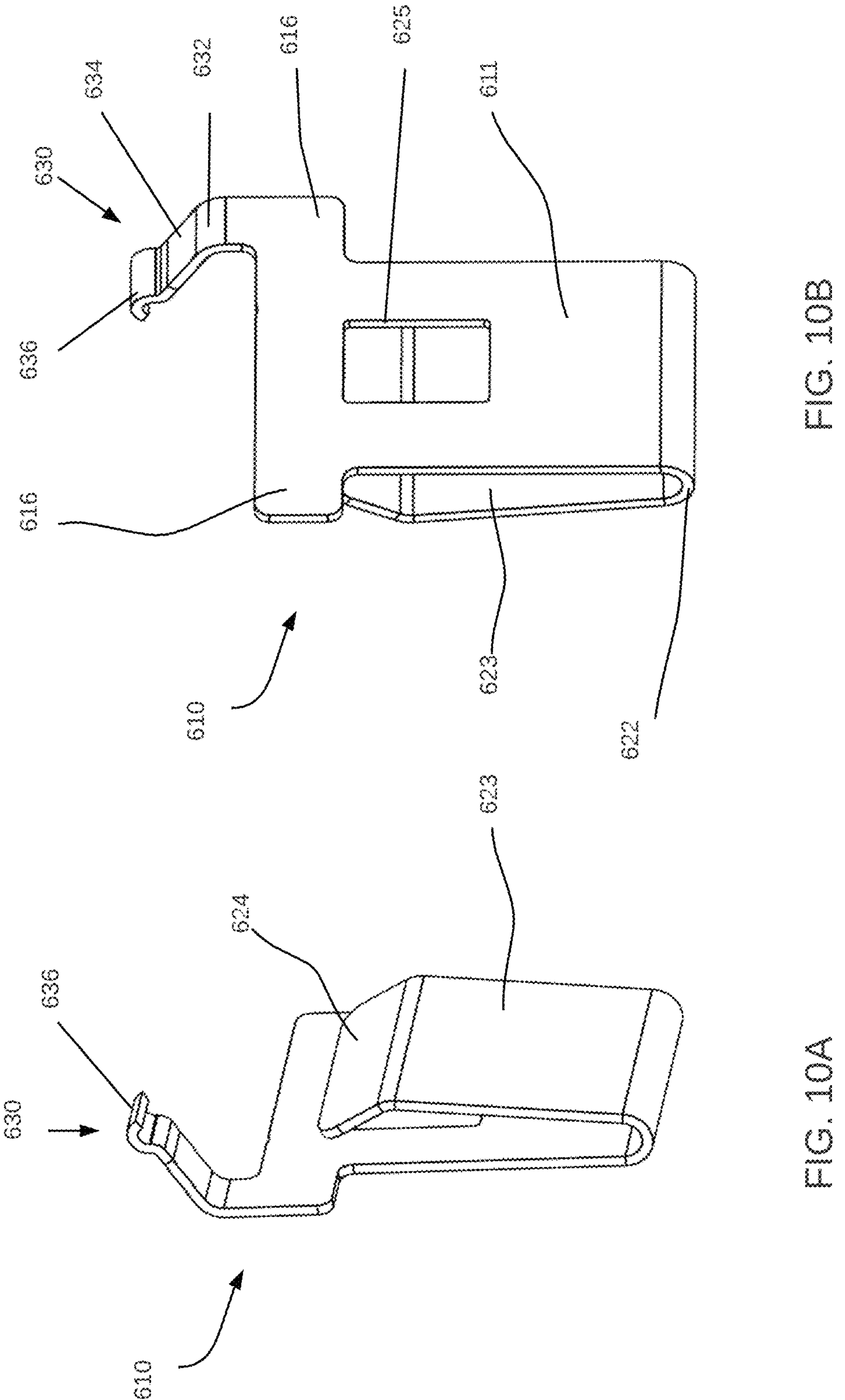
FIG. 10A is a top left front perspective view of a single-battery contact, in accordance with embodiments of the present disclosure.
FIG. 10B is a bottom left rear perspective view of the single-battery contact of FIG. 10A.
Figure 11A:
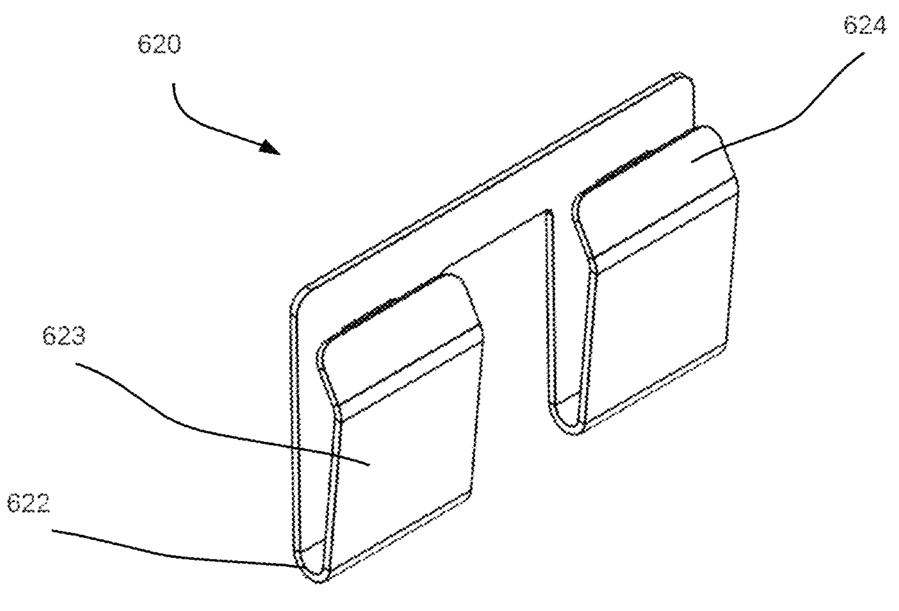
FIG. 11A is bottom left front perspective view of a dual-battery contact including a power terminal, in accordance with embodiments of the present disclosure.
Figure 11B:
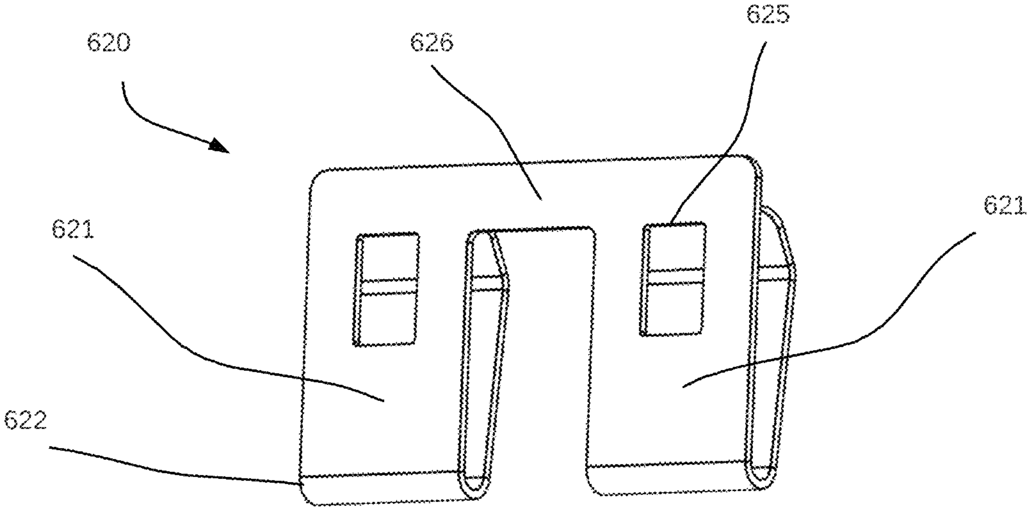
FIG. 11B is a right rear perspective view of the dual-battery contact of FIG. 11A.

The structure of the single-battery contacts 610 is depicted in FIG. 10A and FIG. 10B, while the structure of the dual-battery contacts 620 is depicted in FIG. 11A and FIG. 11B. The single-battery contact 610 has a battery-engaging portion 623 connected to a battery contact back-wall 611 via a flexible portion 622. The battery-engaging portion 623 is flexibly biased in a first position and is moveable towards the battery contact backwall 611 to a second position when an object, such as a battery terminal, exerts pressure against the battery-engaging portion 623. The single-battery contact 610 also includes a top portion 624 that is angled with respect to the battery-engaging portion 623 to facilitate the insertion of a battery in contact with the single-battery contact 610. Specifically, the top portion 624 is angled for permitting the battery terminal to slide thereon during battery insertion. The battery contact backwall 611 features an overhang portion 616 for supporting the single-battery contact 610 in the battery compartment 250. In the depicted example, the battery contact backwall 611 has two overhang portions 616. The battery contact backwall 611 includes an aperture 625 for receiving a battery contact retaining tab for keeping the single-battery contact 610 attached to the battery compartment wall 210 to the lower housing sidewall section opposite the battery compartment wall.

A power terminal 630 extends from the battery contact backwall 611 upwardly at an angle. The power terminal 630 comprises a flexible portion 632, a straight portion 634, and a PCB contact 636. When a PCB 300 is inserted into the electronic device housing 1000, the positive power pad 330A comes into contact with the PCB contact 636 of the positive power terminal 630A and the negative power pad 330B comes into contact with the PCB contact 636 of the negative power terminal 630B. As the PCB is pressed into place, the positive power terminal 630A and the negative power terminal 630B both bend at the flexible portion 632 such that the positive power terminal 630A and the negative power terminal 630B are flexibly biased against the positive power pad 330A and the negative power pad 330B, respectively. This ensures that the PCB 300 is properly receiving electric power from the batteries 800. This arrangement between the power terminals 630, the positive power pad 330A, and the negative power pad 330B requires no additional leads, vias, wires, or connectors. Advantageously, the cost is reduced and complexity is averted.

The dual-battery contact 620 is shown in FIG. 11A and FIG. 11B. The dual-battery contact 620 is comprised of two battery contacts (similar to the single-battery contact but without an overhang portion) connected by a transverse connecting portion 626. Each battery contact of the dual-battery contact 620 has a battery contact backwall 621 and a battery-engaging portion 623 connected with the battery contact backwall 621 via a flexible portion 622. Each battery contact of the two battery contacts of the dual-battery contact 620 also features a top portion 624 extending at an angle from the battery-engaging portion 623, and an aperture 625 in the battery contact backwall 621.

Figure 7:
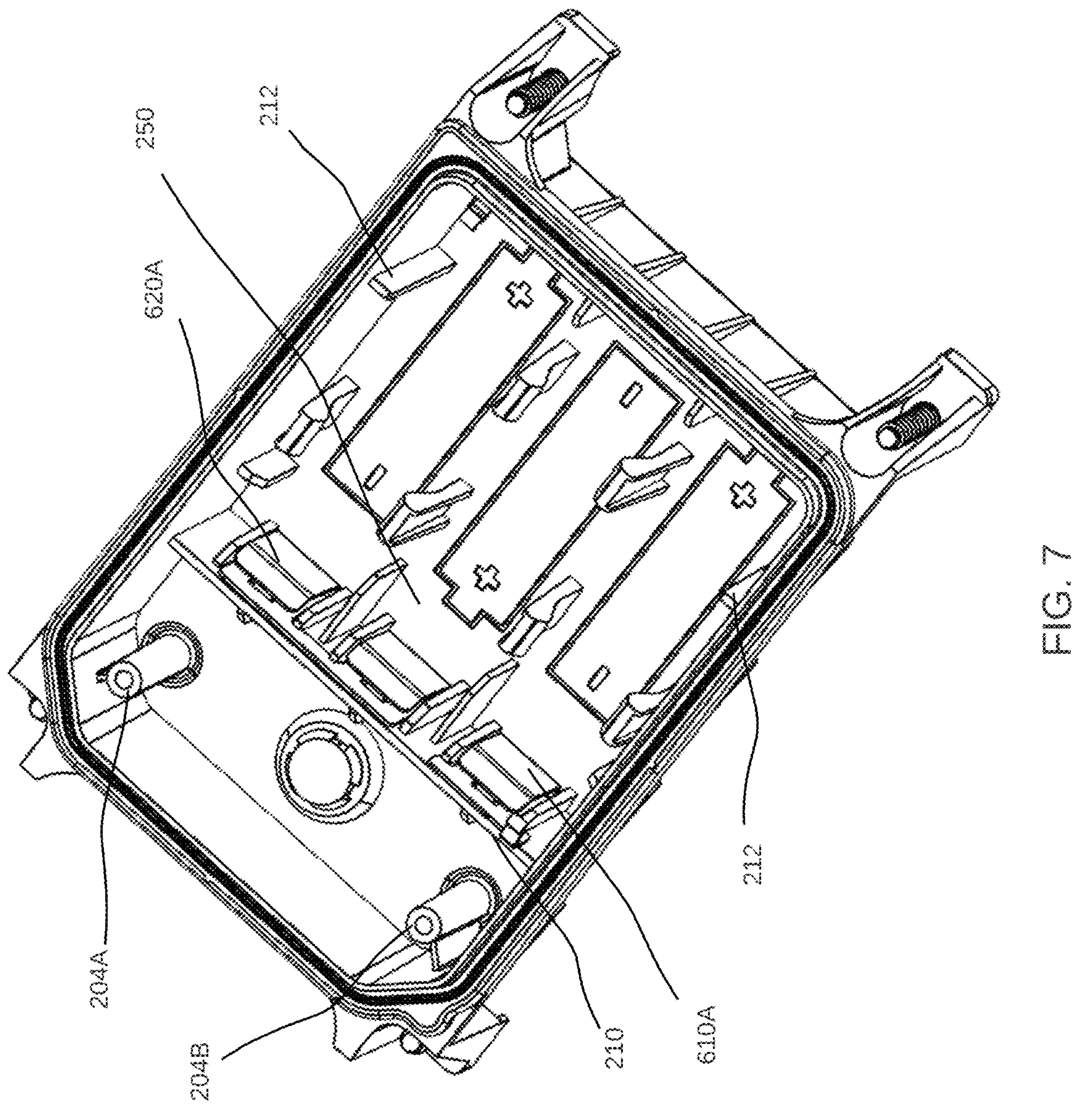
FIG. 7 is a top left front perspective view of the second housing portion with the batteries removed therefrom, in accordance with embodiments of the present disclosure.
Figure 8:
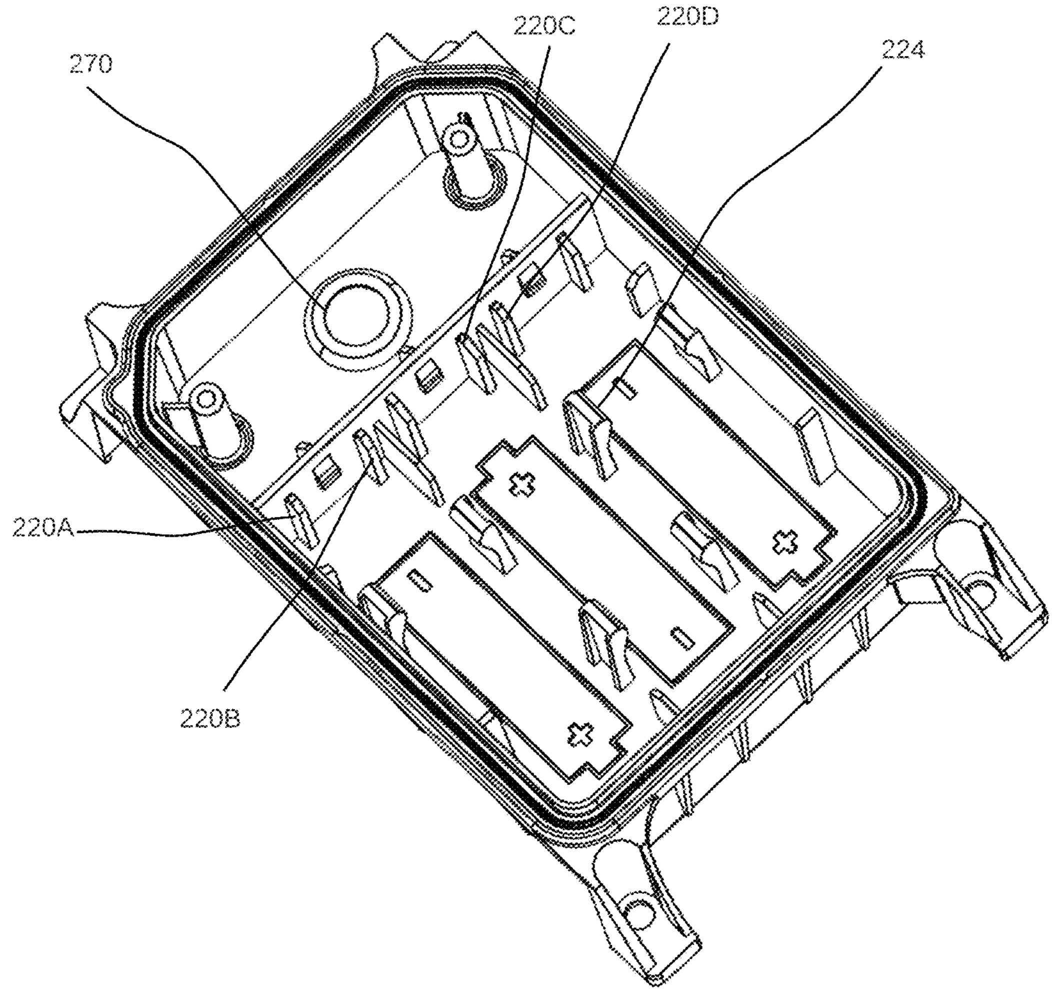
FIG. 8 is a top left front perspective view of the second housing portion with the batteries and the battery contacts removed therefrom, in accordance with embodiments of the present disclosure.
Figure 9:
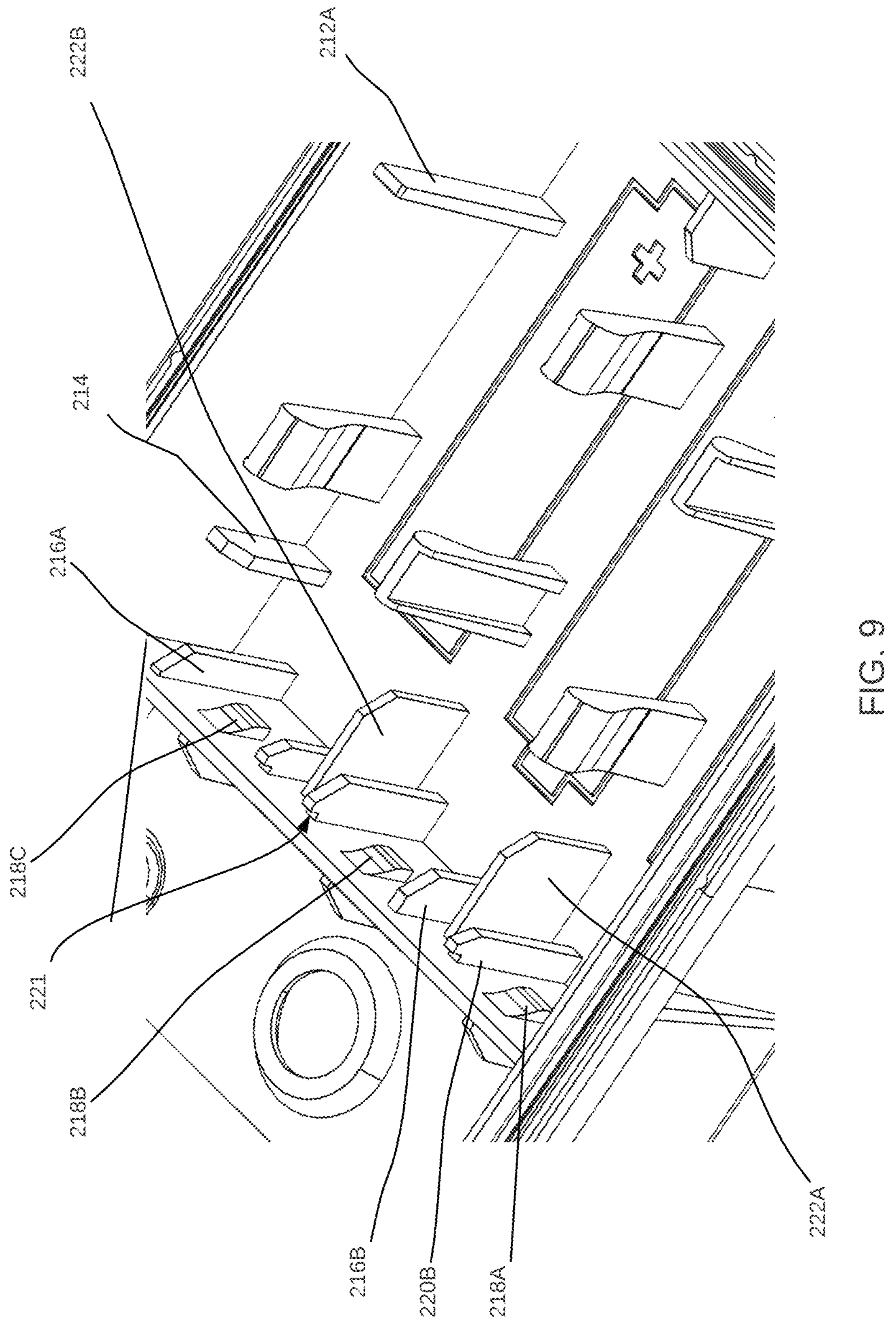
FIG. 9 is a close-up top left front perspective view of the battery compartment in the second housing portion, in accordance with embodiments of the present disclosure.

The single-battery contacts 610 and the dual-battery contacts 620 are installed in the battery compartment by engaging a number of elements which are best explained with reference to FIG. 7, FIG. 8, and FIG. 9. The single-battery contact 610 is pushed downwardly into place such that the battery contact retaining tab 218A is inserted into the aperture 625. The battery contact retaining tab 218A is sloped such that the single-battery contact 610 may slide downwardly thereon until the battery contact retaining tab 218A fits into the aperture 625 but has a straight bottom wall so that the battery contact may not slide upwardly in the opposite direction so as to be dislodged from the battery contact retaining tab 218A. This may be accomplished by the battery contact retaining tab having a sloping top surface and a straight bottom surface, as shown. The engagement between straight bottom edge of the battery contact retaining tab 218A and the inside borders of the aperture 625 prevents the single-battery contact 610 from sliding upwards by an upward force resulting in the removal thereof from the battery compartment 250.

The overhang portions 616 of the single-battery contact 610A rest on and are retained within the battery contact support notches 221 of the battery contact supports 220A and 220B. The retention of the overhang portions 616 within the battery contact support notches 221 prevents the single-battery contact 610A from further downward movement during and after installation, and also prevents the single-battery contact 610 from being dislodged from the battery compartment wall 210 in the horizontal direction. The engagement of the overhang portions 616 within the battery contact support notches 221 thus prevents downward and horizontal movements that could result in the removal of the single-battery contact 610 from the integrated battery compartment 250.

The dual-battery contact 620A is slid into place between the dual-battery contact edge retainers 216A and 216B. The dual-battery contact edge retainers 216A and 216B retain the dual-battery contact such that it does not move or wiggle sideways along the battery compartment wall 210. The battery contact retaining tabs 218B and 218C fit into the apertures 625 as described above with reference to the single-battery contact 610A. The transverse connecting portion 626 rests within the battery contact support notches 221 of the battery contact supports 220C and 220D. The retention of the transverse connecting portion 626 within the battery contact support notches 221 of the battery contact supports 220B and 220C prevents the single-battery contact from further downward movement during and after installation, and prevents the dual-battery contact 620A from being dislodged from the battery compartment wall 210.

Similar arrangements for installing the single-battery contact 610B and the dual-battery contact 620B to the lower housing sidewall 230 are used as described above. Advantageously, the single-battery contacts 610 and the dual-battery contacts 620 are installed into the battery compartment 250 without the need for fasteners or glue. The battery contacts are firmly supported in place and cannot be dislodged when the electronic device experiences an impact or a fall, for example.

Battery Installation and Retention

As discussed above, the single-battery contacts 610 and the dual-battery contacts 620 all feature an angled top portion 624. The top portion 624 is angled such that the battery terminals slide thereon during battery installation. The flexible portion 622 allows the battery-engaging portion 623 and the top portion 624 to flex towards the battery contact backwall 621 (or 611) under pressure from the battery terminals. The battery compartment 250 is thus sized such that when a battery 800 is inserted between two opposite battery contacts, the battery-engaging portion 623 and the top portion 624 have to flex towards the battery contact backwall contact for permitting the battery to descend into the battery compartment 250. Additionally, the battery-engaging portion 623 is angled and dimensioned for imparting an inward axial and downward force on the battery for retaining the battery within the battery compartment. For example, with reference to FIG. 12B, the battery-engaging portion 623 of the single-battery contact 610A is exerting an inward axial (i.e., towards the battery terminal and substantially in the direction of the axis of the edge battery 800A) and downward force (shown by an arrow) on the positive terminal of the edge battery 800A. Similarly, the battery-engaging portion 623 of the dual-battery contact 620B exerts an inward (i.e., towards the inside of the battery compartment) and downward (i.e., towards lower housing bottom 235) on the negative terminal of the edge battery 800A.

Figure 13A:
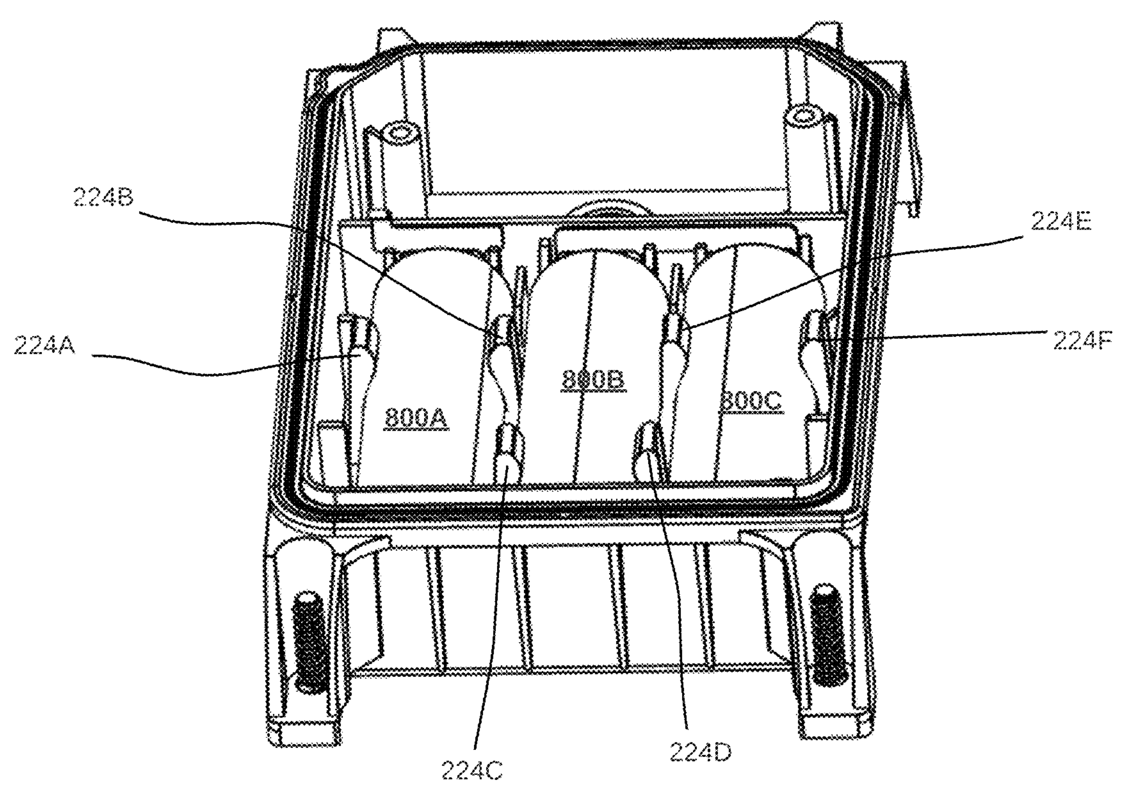
FIG. 13A is a top front perspective view of the lower housing showing batteries retained in place by lateral battery retainers, in accordance with embodiments of the present disclosure.
Figure 13B:
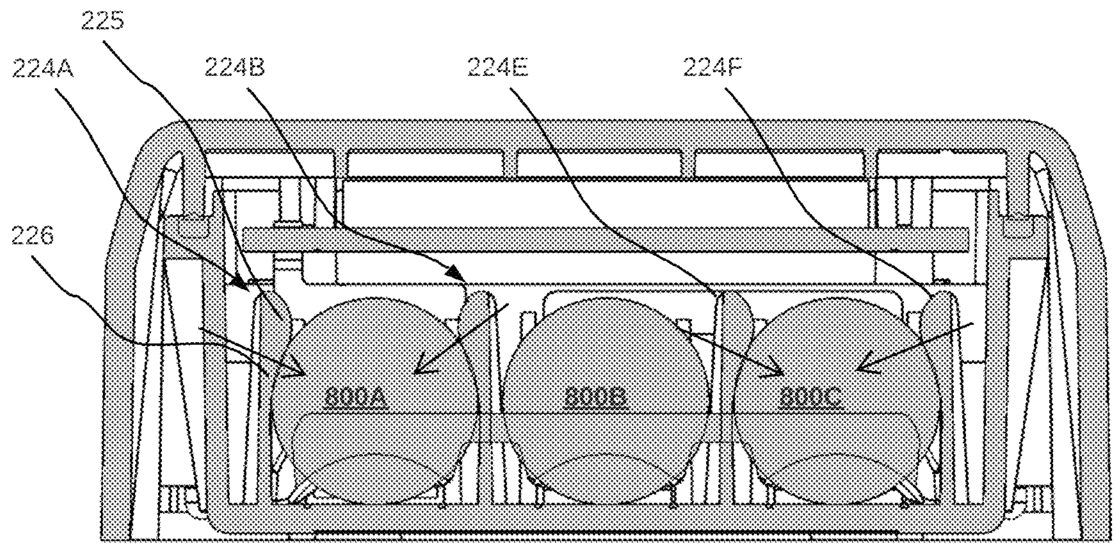
FIG. 13B is a front sectional view taken at the line A-A of FIG. 6 showing lateral battery retainers in action, in accordance with embodiments of the present disclosure.

The battery compartment 250 also includes structures and elements for retaining the batteries in place despite impacts, falls, or other types of motion. The PCB edge supports 212 along with the battery edge spacers 214 keep the edge battery 800A and the edge battery 800C spaced from the lower housing sidewall 230 and oriented parallel thereto. The battery separators 222A and 222B separate the center battery 800B from the edge battery 800A and the edge battery 800C and help keep all three batteries 800 oriented parallel to the opposite sides of the lower housing sidewall 230 that are perpendicular to the battery compartment wall 210. The battery compartment 250 also features at least one pair of opposite battery retainers that each exerts an inward radial force on a battery sidewall and thus retain the batteries in place. Pairs of opposite battery retainers are shown as upstanding structures that laterally engage the battery sidewalls. With reference to FIG. 13A and FIG. 13B, the battery retainers 224A-224E extend upwardly from the integrated battery compartment bottom wall which is the lower housing bottom 235. The battery retainers 224 are each shown to have a substantially convex upper portion 225 and a substantially concave lower portion 226. The battery retainers 224 flex outwardly during the insertion of a battery therebetween, then flex back inwardly to encompass the battery 800 and impart a substantially radial inward force (denoted by the arrows) thereon. The substantially convex upper portion 225 facilitates the insertion of the batteries in the integrated battery compartment. During installation the battery sidewall abuts the convex upper portion and slides thereon as the battery retainer 224 flexes outwardly under pressure from the battery sidewall. As the battery is inserted deeper in place within the integrated battery compartment 250, the battery retainers 224 flex back inwardly and the substantially concave lower portion 226 engages and encompasses a portion of the battery sidewall thus imparting a substantially radial inward force on the battery sidewall. The substantially radial inward force on the battery sidewall prevents lateral and upward movement that could lead to dislodging the batteries out of place as a result of the electronic device housing 1000 experiencing an impact or a fall.

Figure 14A:
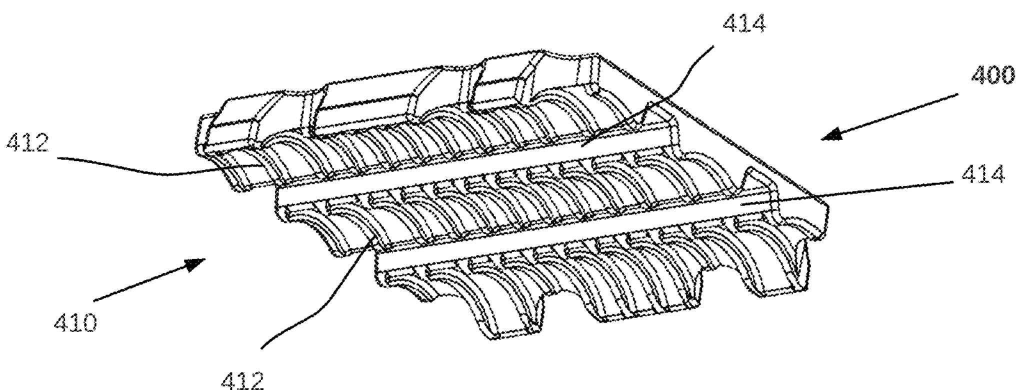
FIG. 14A is a bottom left front perspective view of a retainer pad, in accordance with embodiments of the present disclosure.
Figure 14B:
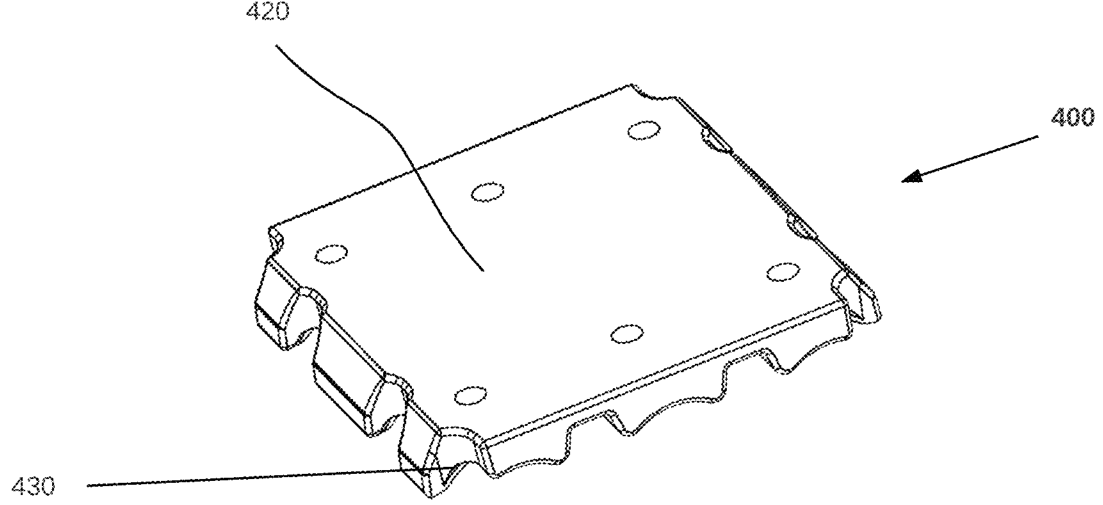
FIG. 14B is a top left front perspective view of the retainer pad of FIG. 14A.
Figure 14C:
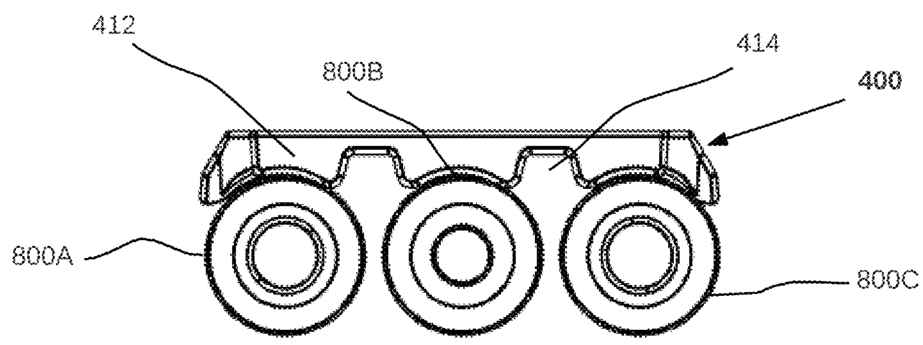
FIG. 14C is a front elevation view of the retainer pad of FIG. 14A in engagement with three batteries.

The batteries 800 are further retained in place within the battery compartment 250 by the retainer pad 400, best depicted in FIG. 14A, FIG. 14B, and FIG. 14C. The retainer pad 400 is a structure made of insulating material shaped to fit between the batteries 800 and the PCB 300. The retainer pad 400 has a PCB-facing side 420 which is generally planar to contact the battery-facing side 320 of the PCB 300. The retainer pad 400 has a battery-facing side 410 which is shaped to conform to the sidewalls of batteries 800. For example, the battery-facing side has a plurality of curved ribs 412 for engaging the sidewall of each of the batteries 800 thus further retaining the batteries 800 in place. In the depicted embodiment, there are three pluralities of curved ribs 412 arranged to engage each of the edge battery 800A, center battery 800B, and edge battery 800C. The three pluralities of curved ribs 412 are separated from one another by channels 414 that are formed therebetween. The ribs are curved to conform to the shape of the sidewalls of the batteries 800.

The retainer pad 400 is made of flexible material to provide some cushioning between the batteries 800 and the PCB 300 during shocks or impacts imparted on the electronic device housing 1000. Furthermore, the retainer pad 400 is made from dielectric (insulating) material so as not to cause any short circuiting between the electronic components placed on the PCB 300. In some embodiments, the retainer pad 400 is made from conducting or semiconducting material but the PCB-facing side has a dielectric coating.

The retainer pad 400 has cutout portions 430 for passing the power terminal 630 therethrough such that the PCB contact 636 is in electrical contact with the PCB power pads, namely the positive power pad 330A and the negative power pad 330B.

Figure 15:
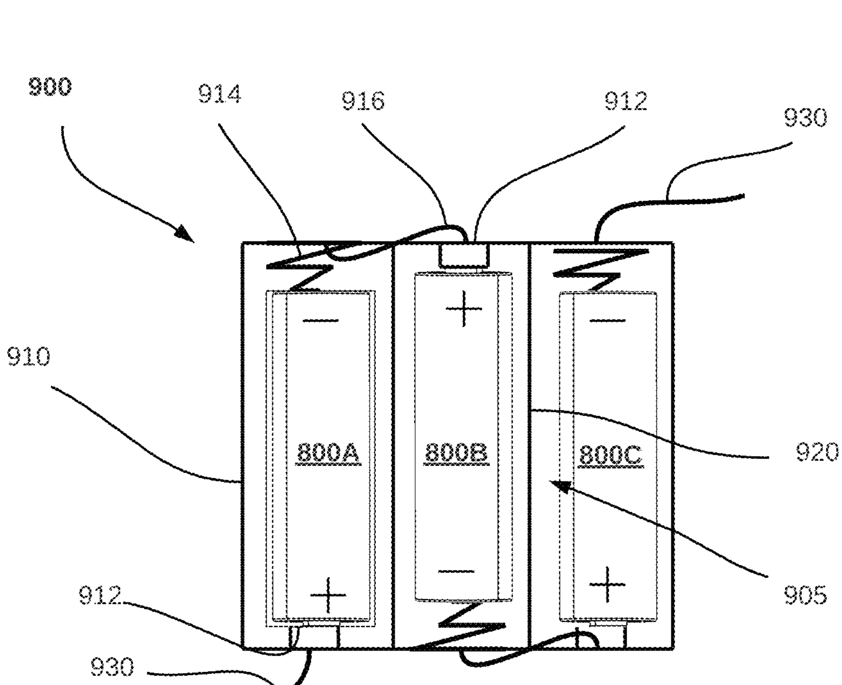
FIG. 15 is a top plan view of a prior art retainer pad.
Figure 16A:
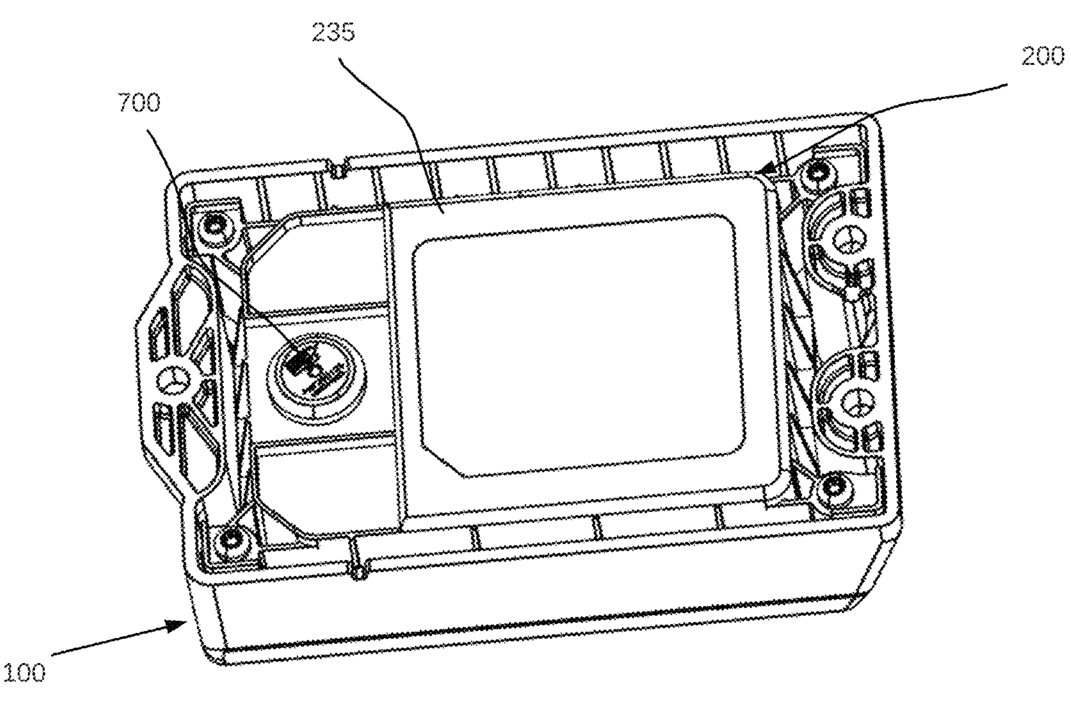
FIG. 16A is a bottom left perspective view of the electronic device of FIG. 1.
Figure 16B:
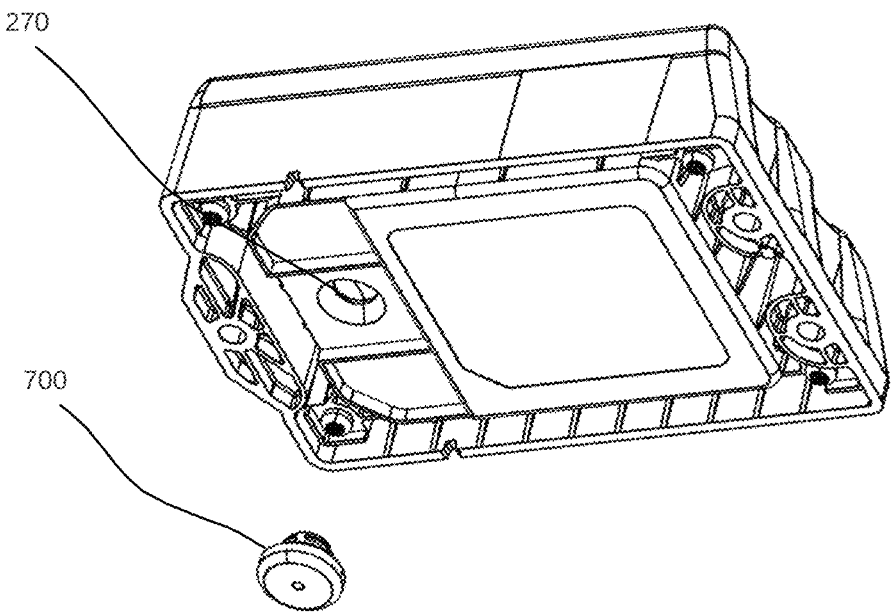
FIG. 16B is a bottom right front perspective view of the electronic device of FIG. 16A wherein the vent is broken away from the lower housing.
Figure 17A:
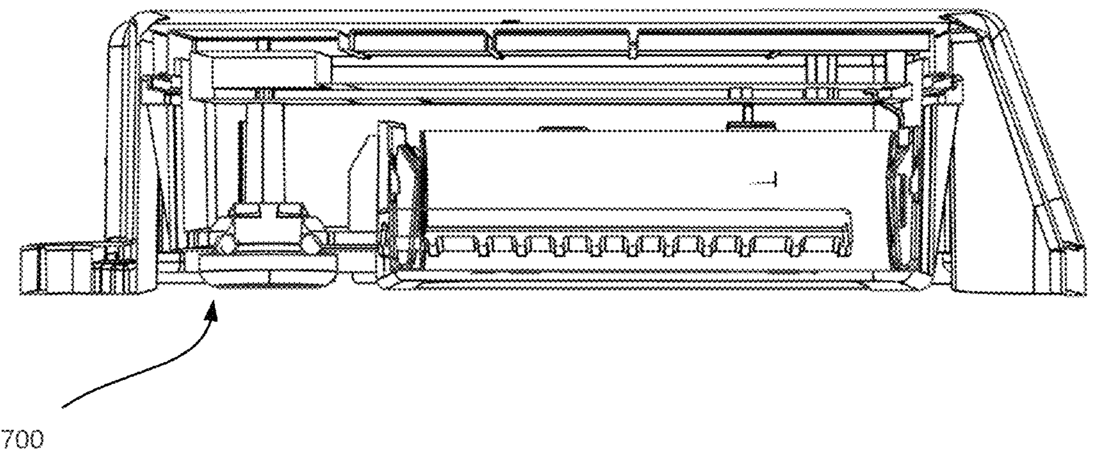
FIG. 17A is a left side sectional view of the electronic device of FIG. 1 showing the vent, in accordance with embodiments of the present disclosure.
Figure 17B:
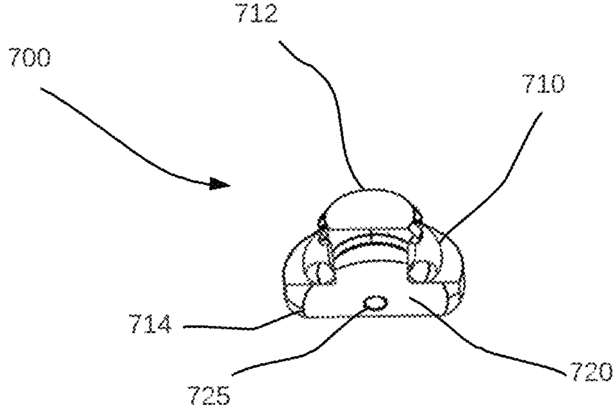
FIG. 17B is a top sectional perspective view of the vent.

The battery compartment 250 formed in the lower housing portion 200 thus provides the capability to retain batteries 800 therein and resist the dislodging of such batteries under various forces of impact, dropping, shaking, or extreme movement imparted on the electronic device housing 1000 containing the lower housing portion 200. The battery compartment 250 is integrally formed in the lower housing portion 200 and does not need special arrangements for connecting to the PCB 300. By contrast, a prior art battery compartment is shown in FIG. 15. The battery compartment 900 has a bottom 905 and sidewall 910. The battery compartment 900 is divided into sections each for retaining a single battery. The sections are separated by partition walls 920. The batteries 800 are each inserted in a section between a positive battery contact and a negative battery contact. The positive battery contact 912 is generally a metallic plate that comes in contact with the battery positive terminal. The negative battery contact 914 is in the form of a metallic spring. The negative battery contact 914 comes in contact with the negative battery terminal and is compressed upon the insertion of the battery between the negative battery contact 914 and the positive battery contact 912. When the negative battery contact 914 is compressed, the negative battery contact 914 exerts axial force on the battery keeping the positive terminal thereof in contact with the positive battery contact 912. The battery compartment 900 does not have any means for preventing the batteries from being dislodged therefrom as a result of impact force that may have a component in the direction perpendicular to the bottom 905. The battery compartment 900 features electrical connections 916 between the individual battery contacts for connecting the batteries therein in series. The supply voltage provided by the battery compartment 900 is provided between two PCB leads 930; one at the positive battery contact 912 corresponding to the edge battery 800A and another at the negative battery contact 914 of the edge battery 800C. The two PCB leads 930 connect to a PCB, such as the PCB 300 either by soldering the ends thereof to pads or vias on the PCB, or by having a connector (not shown) at the ends of the two PCB leads 930 that is configured to connect to a corresponding connect on the PCB. The cost of the battery compartment 900, the soldering step and/or the connectors that connect the battery compartment 900 to the PCB 300 all add to the cost of making the electronic device housing 1000.

The integrated battery compartment 250 provides enhanced battery retention capability that allows an electronic device using the electronic device housing 1000 to be deployed in harsh conditions wherein the electronic device housing 1000 may be subjected to impacts, falls, shaking motion, and the like. Despite the harsh conditions, the batteries 800 in the integrated battery compartment 250 are retained in place and are not dislodged. Additionally, the integrated battery compartment 250 is not a separate component that has to be purchased separately adding to the cost of the electronic device. The integrated battery compartment 250 also connects, via the power terminals extending from the battery contacts to the PCB without the need for soldering or using additional connectors thus the design of the electronic device housing 1000 is simplified and the cost is reduced.

Some electronic devices are deployed in the field where they may face some moisture. As such, the upper housing portion 100 and the lower housing portion have a tight fit as facilitated by the seal 240. The tight fit allows the electronic device to be certified for ingress protection. The inside of the electronic device housing 1000 may still need ventilation.

For example, when the electronic device is deployed in chilly weather, the air inside the electronic device contracts and the pressure thereof drops. As such the housing of the electronic device may deform as the ambient air pressure from outside the device becomes higher than the air pressure inside the electronic device. The ambient air pressure exert forces on the upper housing portion 100 and/or the lower housing portion 200 potentially causing deformation. A deformation in the upper housing portion 100 and/or the lower housing portion 200 may affect the tight fit between the upper housing portion 100 and the lower housing portion 200 at the seal 240 thus affecting the ingress protection feature and potentially allowing moisture into the electronic device.

As another example, when the electronic device is deployed in cold conditions, the air inside the electronic device may contain moisture. The moisture will condense on the inner surface of the sidewalls, such as the upper housing sidewall 130 and/or the lower housing sidewall 230. In order for the moisture to be let out of the electronic device, the electronic device housing needs to have ventilation capability of the inside thereof.

To enable the ventilation of the interior space inside of the electronic device housing 1000, the lower housing portion has a vent hole 270 sized for receiving a vent 700. The vent hole 270 and the vent 700 are best described with reference to FIG. 16A, FIG. 16B, FIG. 17A, and FIG. 17B. The vent 700 is a structure having sidewall 710 defining an inlet 714 and an outlet 712. Ambient air may enter the inlet 714, pass through the vent 700, and exit at the outlet 712 which extends into the interior space of the housing formed by the upper housing portion 100 and the lower housing portion 200. Conversely, if there is moisture inside the electronic device the moisture may escape through the outlet 712, pass through the vent 700, and exit at the inlet 714. As can be seen the terms "inlet" and "outlet" are context-specific. It may then be said that the vent has a first opening and a second opening, for example. Generally speaking, the vent helps equalize the air pressure inside the electronic device housing to match the air pressure outside the electronic device housing.

To prevent moisture from entering the electronic device housing 1000 via the vent 700, the inlet 714 is sealed by a membrane 720 having a venting aperture 725 sized for passing air therethrough but blocking any liquid droplets from passing therethrough. Advantageously, the electronic device housing has the advantage of having air pressure that is equalized with the ambient air, while at the same time is protected from having additional moisture or liquids entering therein.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

What is claimed is:

1. An electronic device housing, comprising:

a first housing portion; and a second housing portion configured to be coupled with the first housing portion in a sealing connection therebetween for forming the electronic device housing, the second housing portion including an integrated battery compartment having at least two opposite battery contacts at opposite sides of the integrated battery compartment for providing electrical connection with a battery inserted in the integrated battery compartment, the at least two opposite battery contacts each including a battery-engaging portion flexibly biased against a battery terminal of the battery and angled and dimensioned for exerting an inward force axial to the battery and a downward force towards a bottom of the second housing portion, the at least two opposite battery contacts further including two respective power terminals each including a flexible portion configured to be flexibly biased against a power terminal of a printed circuit board for providing power from the battery to the printed circuit board.

2. The electronic device housing of claim 1, further comprising at least one pair of opposite battery retainers configured for exerting a substantially radial inward force on a battery sidewall of the battery for retaining the battery in the integrated battery compartment, each battery retainer of the at least one pair of opposite battery retainers configured to:

flex outwardly upon abutting with the battery sidewall during insertion of the battery; and flex back inwardly upon full insertion of the battery into the integrated battery compartment for exerting the substantially radial inward force on the battery sidewall.

3. The electronic device housing of claim 2, wherein the at least one pair of opposite battery retainers is comprised of a first battery retainer and a second battery retainer each extending upwardly from an integrated battery compartment bottom wall.

4. The electronic device housing of claim 3, wherein each of the first battery retainer and the second battery retainer comprises a convex upper portion for abutting and sliding against the battery sidewall during insertion of the battery.

5. The electronic device housing of claim 3, wherein each of the first battery retainer and the second battery retainer comprises a concave lower portion for encompassing a portion of the battery sidewall.

6. The electronic device housing of claim 1, wherein:

the second housing portion has a sidewall including a groove at a top end thereof, the groove having a seal molded therein; and the first housing portion has a rib located and dimensioned for mating with and compressing the seal when the first housing portion and the second housing portion are coupled to one another in the sealing connection.

7. The electronic device housing of claim 6, wherein the second housing portion is made using a two-step injection molding process including:

making the second housing portion including the groove using a first injection molding tool; and injecting the seal in the groove using a second injection molding tool.

8. The electronic device housing of claim 1, wherein the at least two opposite battery contacts each further comprises a top portion connected to the battery-engaging portion and angled for permitting the battery terminal to slide thereon during battery insertion.

9. The electronic device housing of claim 1, wherein the integrated battery compartment is bounded at one end thereof by a battery compartment wall.

10. The electronic device housing of claim 9, wherein a first battery contact of the at least two opposite battery contacts is attached to the battery compartment wall and a second battery contact of the at least two opposite battery contacts is attached to a lower housing sidewall section opposite the battery compartment wall.

11. The electronic device housing of claim 10, wherein:

each of the battery compartment wall and the lower housing sidewall section opposite the battery compartment wall contains at least one battery contact retaining tab; and each of the at least two opposite battery contacts has a backwall including an aperture shaped for receiving a battery contact retaining tab.

12. The electronic device housing of claim 11, wherein the battery contact retaining tab is shaped for allowing the backwall to slide downwardly thereon until the battery contact retaining tab is inserted within the aperture.

13. The electronic device housing of claim 11, wherein the battery contact retaining tab is shaped for preventing removal of the battery contact retaining tab from the aperture by an upward force on any of the at least two opposite battery contacts.

14. The electronic device housing of claim 11, wherein the at least two opposite battery contacts comprise two single-battery contacts and two dual-battery contacts, and the integrated battery compartment holds three batteries.

15. The electronic device housing of claim 14, wherein each of the two single-battery contacts comprises a battery contact backwall having at least one overhang portion.

16. The electronic device housing of claim 15 wherein each of the battery compartment wall and the lower housing sidewall section opposite the battery compartment wall contains at least one battery contact support for supporting a corresponding single-battery contact of the two single-battery contacts at the at least one overhang portion thereof.

17. The electronic device housing of claim 16, wherein each of the battery compartment wall and the lower housing sidewall section opposite the battery compartment wall contains at least one battery contact support for supporting a corresponding dual-battery contact at a transverse connecting portion thereof.

18. The electronic device housing of claim 1, wherein:

the first housing portion contains at least one anchoring member extending towards the second housing portion when the first housing portion is coupled with the second housing portion; and the second housing portion contains at least one anchor receiving member for receiving the at least one anchoring member.

19. The electronic device housing of claim 1, further comprising a retainer pad for separating the battery and a printed circuit board (PCB), the retainer pad having a battery-facing side configured to engage a sidewall of the battery and a PCB-facing side that is generally planar to engage the printed circuit board.

* * * * *